US007170560B2

(12) United States Patent
Tatewaki et al.

(10) Patent No.: US 7,170,560 B2
(45) Date of Patent: Jan. 30, 2007

(54) SURVEILLANCE CAMERA WITH IMPACT ABSORBING STRUCTURE

(75) Inventors: Toshikazu Tatewaki, Sagamihara (JP); Masaomi Iiizumi, Yokohama (JP); Jyoji Wada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 671 days.

(21) Appl. No.: 10/309,050

(22) Filed: Dec. 4, 2002

(65) Prior Publication Data

US 2003/0103160 A1 Jun. 5, 2003

(30) Foreign Application Priority Data

Dec. 5, 2001 (JP) ............................ 2001-371319

(51) Int. Cl.
*H04N 7/18* (2006.01)
*H04N 9/47* (2006.01)
*H04N 5/255* (2006.01)

(52) U.S. Cl. ...................................... 348/375; 348/151

(58) Field of Classification Search ................ 348/143, 348/151, 373–376; D16/203
See application file for complete search history.

(56) References Cited

U.S. PATENT DOCUMENTS 5,111,288 A * 5/1992 Blackshear ................. 348/143
5,418,567 A * 5/1995 Boers et al. ................ 348/375
6,950,121 B2 * 9/2005 Tserkovnyuk et al. ........ 348/47
7,055,791 B2 * 6/2006 Lawrence ................... 248/578

FOREIGN PATENT DOCUMENTS

JP 2000-304090 10/2000

* cited by examiner

*Primary Examiner*—Ngoc-Yen Vu
*Assistant Examiner*—Dan Pasiewicz
(74) *Attorney, Agent, or Firm*—Louis Woo

(57) ABSTRACT

A surveillance camera device is provided which has an impact absorbing structure. The camera device includes a rotary base supporting a camera unit, a rotary bracket supporting the rotary base, and coil springs. The coil springs work to elastically urge the rotary base away from the rotary bracket to as to permit the rotary base to move straight against the mechanical pressure of the springs when subjected to a damaging impact on the device, thereby absorbing the impact to avoid damage to the camera unit.

5 Claims, 6 Drawing Sheets

SURVEILLANCE CAMERA WITH IMPACT ABSORBING STRUCTURE

BACKGROUND OF THE INVENTION

1. Technical Field of the Invention

The present invention relates generally to a surveillance camera, and more particularly to a surveillance camera for use with store security, building security, and any other security applications which has an impact absorbing structure working to avoid damage to an internal structure of the camera.

2. Background Art

Typical surveillance cameras present an appearance which persons will perceive to be a surveillance camera clearly and gives the impression that they are being watched in order to prevent crimes before happening, but it gives an unpleasant feeling to customers in the store, for example. The surveillance cameras are, thus, unpopular. In order to avoid such a problem, dome-shaped smoky surveillance cameras which are designed not to give people the pressure mentally have become prevalent. Typical surveillance cameras are classified into two types: an automatically angle adjustable type in which a direction of surveillance can be changed from a remote monitor room and an angle fixed type in which a direction of surveillance is fixed upon installation of the camera.

FIGS. 5 and 6 illustrate an internal structure of the angle fixed type of conventional dome-shaped surveillance camera device.

The camera unit 100 has an image capturing lens 102, a CCD image sensor, and a circuit substrate which are disposed within a casing 101 and works to convert a captured image into an electrical signal and output it. The casing 101 is retained at a side wall thereof by arms 103*a* of a holder plate 103. The holder plate 103 is disposed on the bottom of a support plate 104 to be rotatable to yaw the camera unit 100. The support plate 104 has arms 104*a* and 104*b* which are supported by upright arms 105*a*and 105*b* of a rotary bracket 105 through pins 106 and 107 to be rotatable vertically to tilt the camera unit 100. The rotary bracket 105 has engages at the center thereof a boss 109 of a base plate 108 to be rotatable horizontally to pan the camera unit 100. The base plate 108 is fixed on a body of the camera device (not shown). The camera device has installed therein a main substrate on which a power supply circuit and an image processing circuit are disposed and also has a power cord and a control cord extending outside the camera device for connection with a commercial power supply and an external camera monitor. A smoky dome-shaped resinous cover is installed on the camera device to cover the camera unit 100.

Such a surveillance camera device is usually suspended from a ceiling or installed on a side wall of a building. The installation is achieved by affixing the camera device to the wall temporarily, connecting the power and control cords to the camera device, panning and tilting the camera device while watching the camera monitor, and fixing the camera device in a desired position. In a case where the camera device is installed on the side wall, a vertical direction of a captured image may be inclined after the angle adjustment. The inclination is corrected by yawing the camera unit 100 to stand the image upright. After the direction in which an image is to be captured is determined, the camera device is fixed firmly on the wall.

The surveillance camera device, however, has the drawback in that persons being watched may feel uncomfortable with the surveillance and beat the camera device with, for example, a baseball bat, thus causing damage to an internal structure of the camera device.

SUMMARY OF THE INVENTION

It is therefore a principal object of the present invention to avoid the disadvantages of the prior art.

It is another object of the present invention to provide a surveillance camera device with an impact absorbing structure working to avoid damage to an internal structure of the device.

According to one aspect of the invention, there is provided a surveillance camera device which comprises: (a) a camera unit working to capture an image of a surveillance target and output an image signal indicative of the captured image; (b) a supporting member supporting the camera unit; (c) a bracket supporting the supporting member; (d) an elastic member working to elastically urge the supporting member away from the bracket; (e) a mount body on which the bracket is mounted; and (f) a cover installed on the mount body. If the cover is beaten with, for example, a stick, so that a damaging impact is added to the camera unit, it will cause the supporting member to move against elastic pressure of the elastic member, thereby absorbing the impact on the camera unit to avoid damage thereto. When the impact is attenuated, the supporting member is returned by the elastic pressure of the elastic member to an initial position, thus enabling a camera operation to be resumed.

In the preferred mode of the invention, the bracket has a support arm in which a hole elongated in a vertical direction is formed. The supporting member is retained by the bracket through a screw inserted into the elongated hole so as to permit the supporting member to move straight in the vertical direction along the elongated hole as well as to rotate in the vertical direction about the screw.

The elastic member is implemented by a coil spring disposed between the screw and the support arm.

The camera device further comprises a tilt plate disposed between the supporting member and the support arm. The tilt plate works to define a tilt angle of the supporting member relative to the bracket.

The bracket is made of an annular plate, thereby permitting the camera unit to move into a central opening of the bracket when subjected to a large-scaled impact, thus absorbing the impact completely.

The bracket is retained at a periphery thereof by at least one tension roller and a plurality of guide rollers, thereby allowing the bottom of the camera unit to be disposed close to a mount body, which permits the size of the camera device to be reduced.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(*b*) is a perspective view which shows a mount body;

DESCRIPTION OF THE PREFERRED EMBODIMENTS

Figure 1:
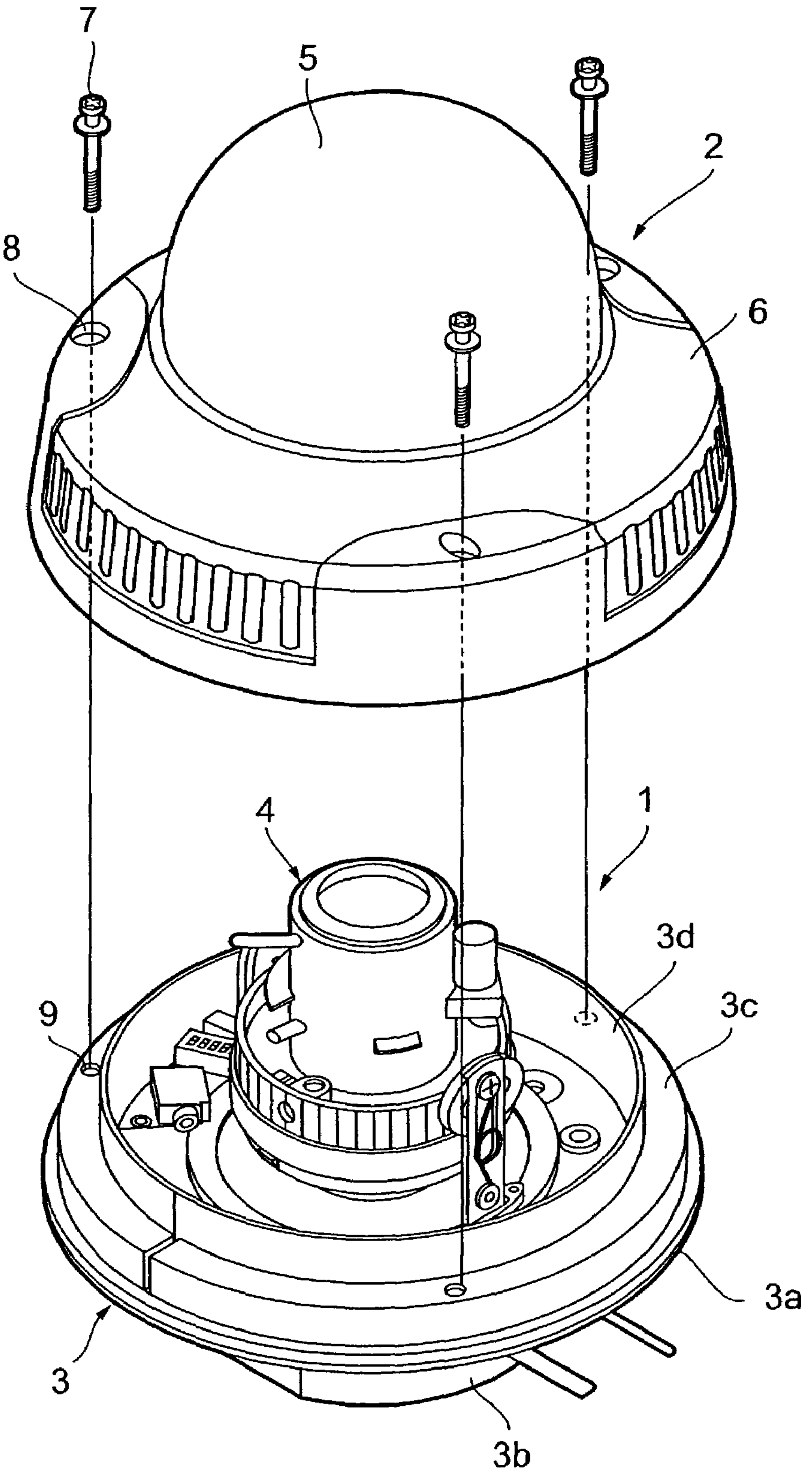
FIG. 1 is an exploded perspective view which shows a surveillance camera device according to the invention.

Referring now to the drawings, particularly to FIG. 1, there is shown the angle fixed type of surveillance camera device consisting of a camera assembly 1 and a domed cover assembly 2. In the following discussion, the terms "upper", "lower", "vertical", and "horizontal" are used to refer to the orientation of the surveillance camera device disposed in the orientation shown in FIG. 1.

The camera assembly 1 consists essentially of a mount body 3 and a camera unit 4. The mount body 3 has an upper flange 3*a* and a lower cylinder 3*b*. The camera unit 4 is installed on the mount body 3. The flange 3*a* has an upper annular flat surface. An annular guide 3*c* is formed on a peripheral portion of the upper surface of the flange 3*a*. The domed cover assembly 2 is fitted on the periphery of the annular guide 3*c*. A ring-shaped upright wall 3*d* is installed as a reinforcement on the upper surface of the flange 3*a*. The domed cover assembly 2 consists of a dome 5 and a cover 6. The dome 5 is made of a fully smoked polycarbonate resin and has a thickness of approximately 3.5 mm. The installation of the domed cover assembly 2 on the camera assembly 1 is achieved by inserting three screws 7 through mount holes 8 in the cover 6 into screw holes 9 in the guide 3*c* of the camera assembly 1.

Figure 2A:
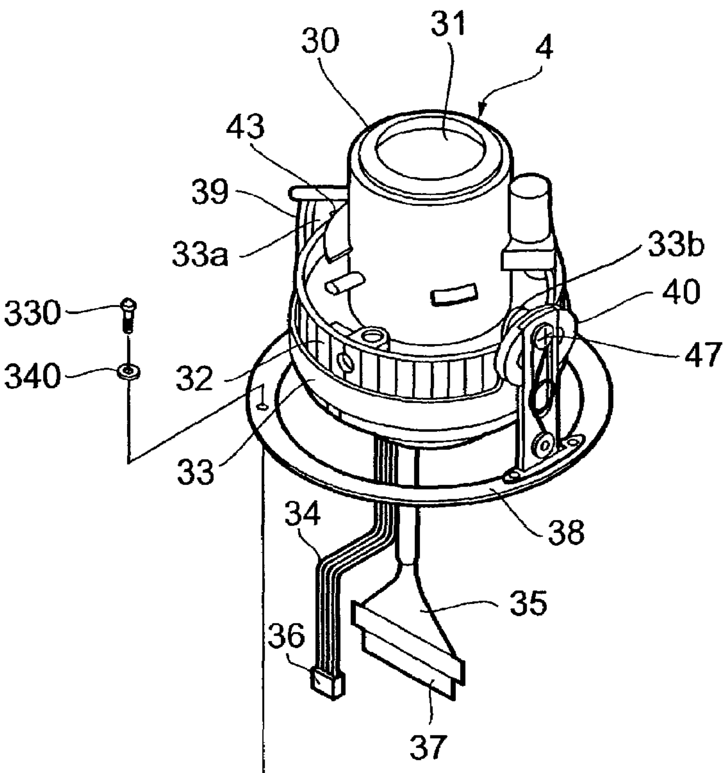
FIG. 2(*a*) is a perspective view which shows a camera unit.
Figure 2B:
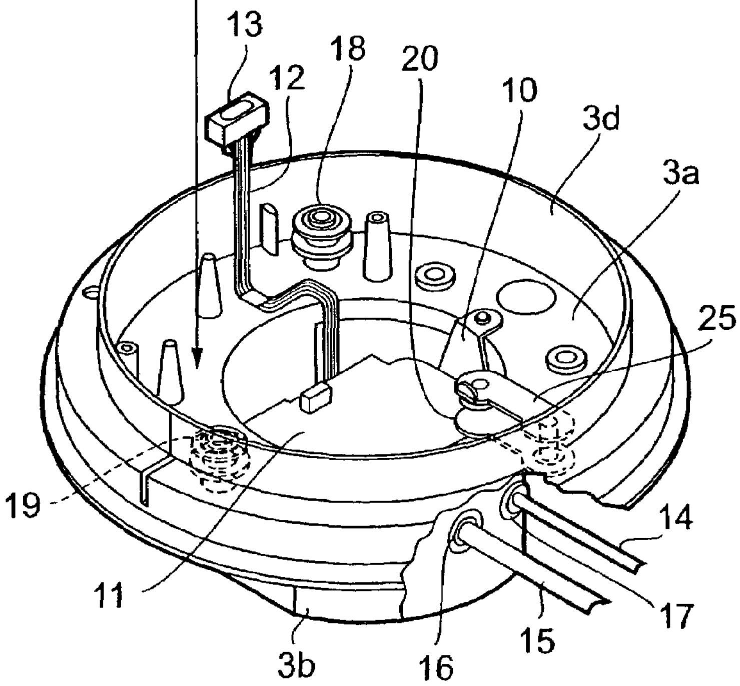
Figure 3:
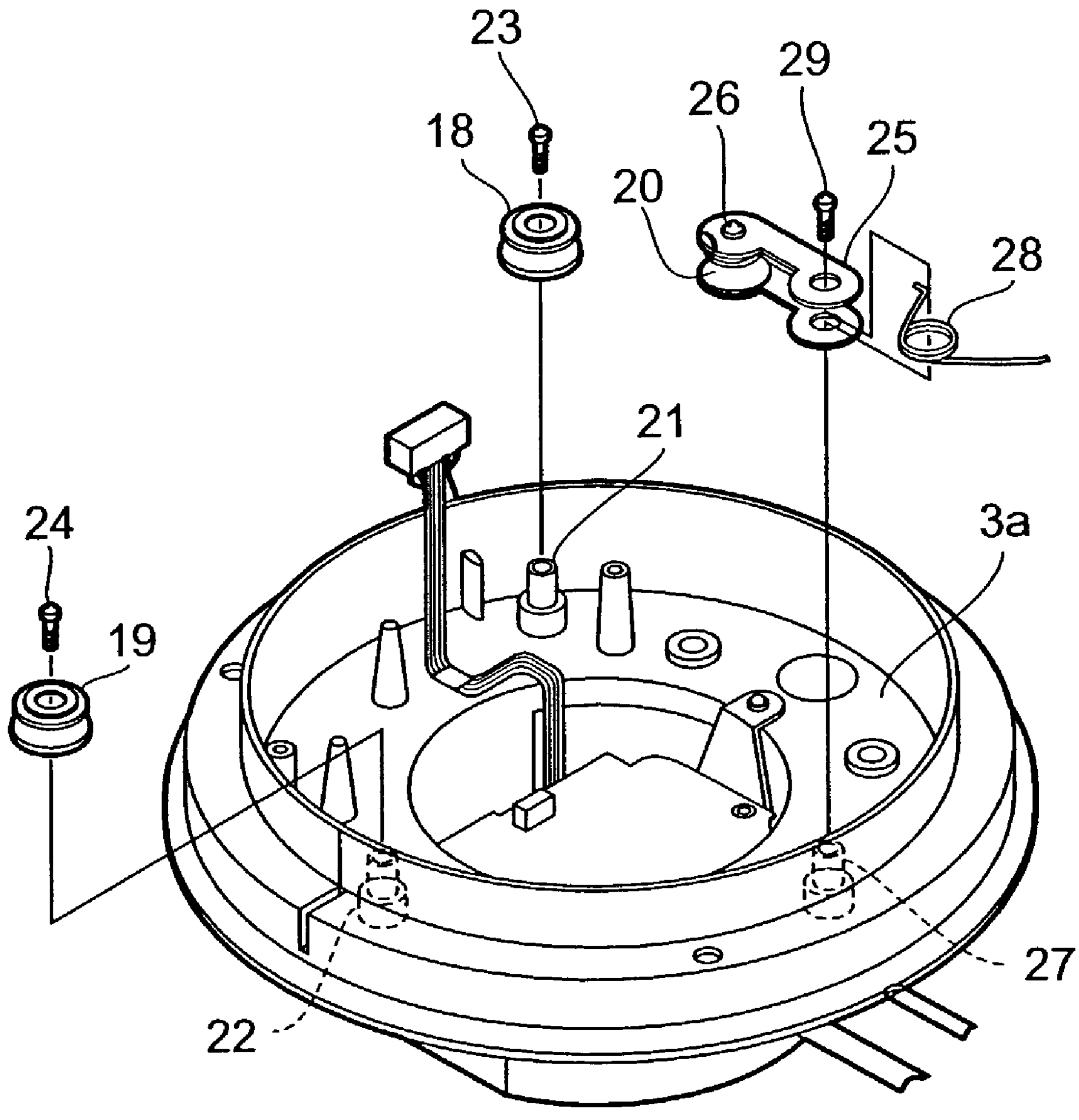
FIG. 3 is an exploded view which shows the mount body of FIG. 2(*b*)

A main circuit substrate 11 is, as clearly shown in FIG. 2(*b*), installed at sides thereof within the cylinder 3*b* of the mount body 3 through brackets 10. A variety of adjustment switches 13 is joined to the main circuit substrate 11 through a harness 12. A control cord 14 and a power cord 15 extend from the main circuit substrate 11 outside the cylinder 3*b* through cord bushings 16 and 17. The control cord 14 is used to transmit a camera output to an external monitor.

Three hourglass-shaped guide rollers 18, 19, and 20 are installed rotatably on the flange 3*a* at regular intervals inside the reinforcement wall 3*d*. The guide rollers 18 and 19 are fitted on studs 21 and 22 projecting from the flange 3*a* and retained by screws 23 and 24, respectively. The guide roller 20 works as a tension roller and installed rotatably by a screw 26 on an end of a lever 25 of a C-shape in cross section. The lever 25 is installed at the other end thereof on a stud 27 on the flange 3*a* rotatably by a screw 29 and urged by a torsion coil spring 28 inward of the flange 3a in a radius direction.

The camera unit 4, as clearly shown in FIG. 2(*a*), includes an image capturing lens 31 installed on an upper end of a cylindrical casing 30, a CCD sensor disposed on a focal point within the casing 30, and a circuit substrate on which a camera control circuit is mounted. An adjustment ring 32 which is formed integrally with the casing 30 is fitted at a lower portion thereof in a hollow cylindrical rotary base 33 to be rotatable to adjust a yaw angle of the camera unit 4. Harnesses 34 and 35 extend from the circuit substrate installed within the casing 30 and are joined at ends thereof to connectors 36 and 37 for electrical connections with the main circuit substrate 11 installed in the mount body 3. Upright strips 33*a* and 33*b* are formed on diametrically opposed ends of the rotary base 33 and held by support arms 39 and 40 to be swingable. The support arms 39 and 40 extend vertically from a rotary bracket 38. The rotary bracket 38 is supported at a periphery thereof by the guide rollers 18, 19, and 20 of the mount base 3 to be rotatable horizontally or panable.

Figure 4:
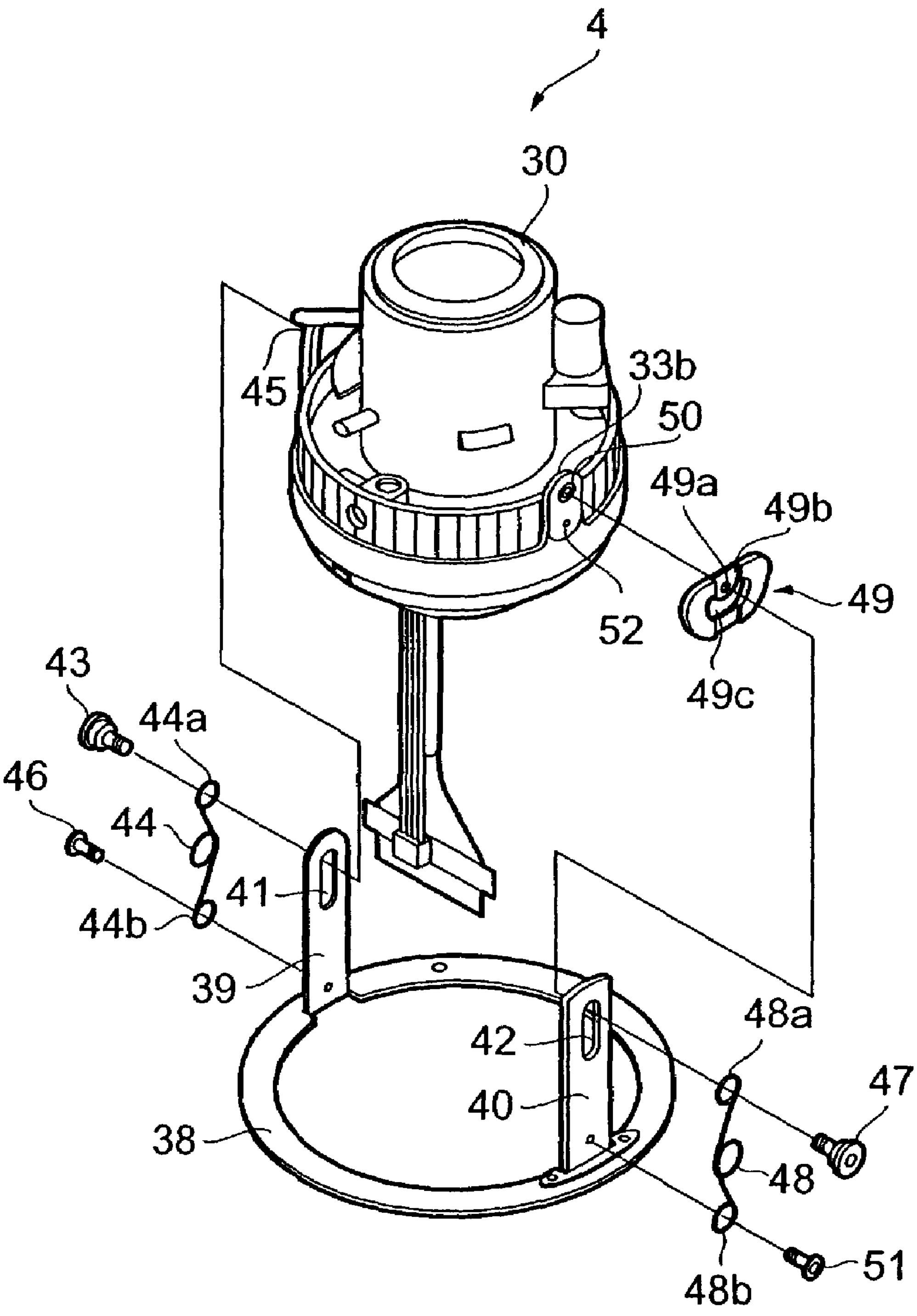
FIG. 4 is an exploded view which shows the camera unit of FIG. 2(*a*)
Figure 5:
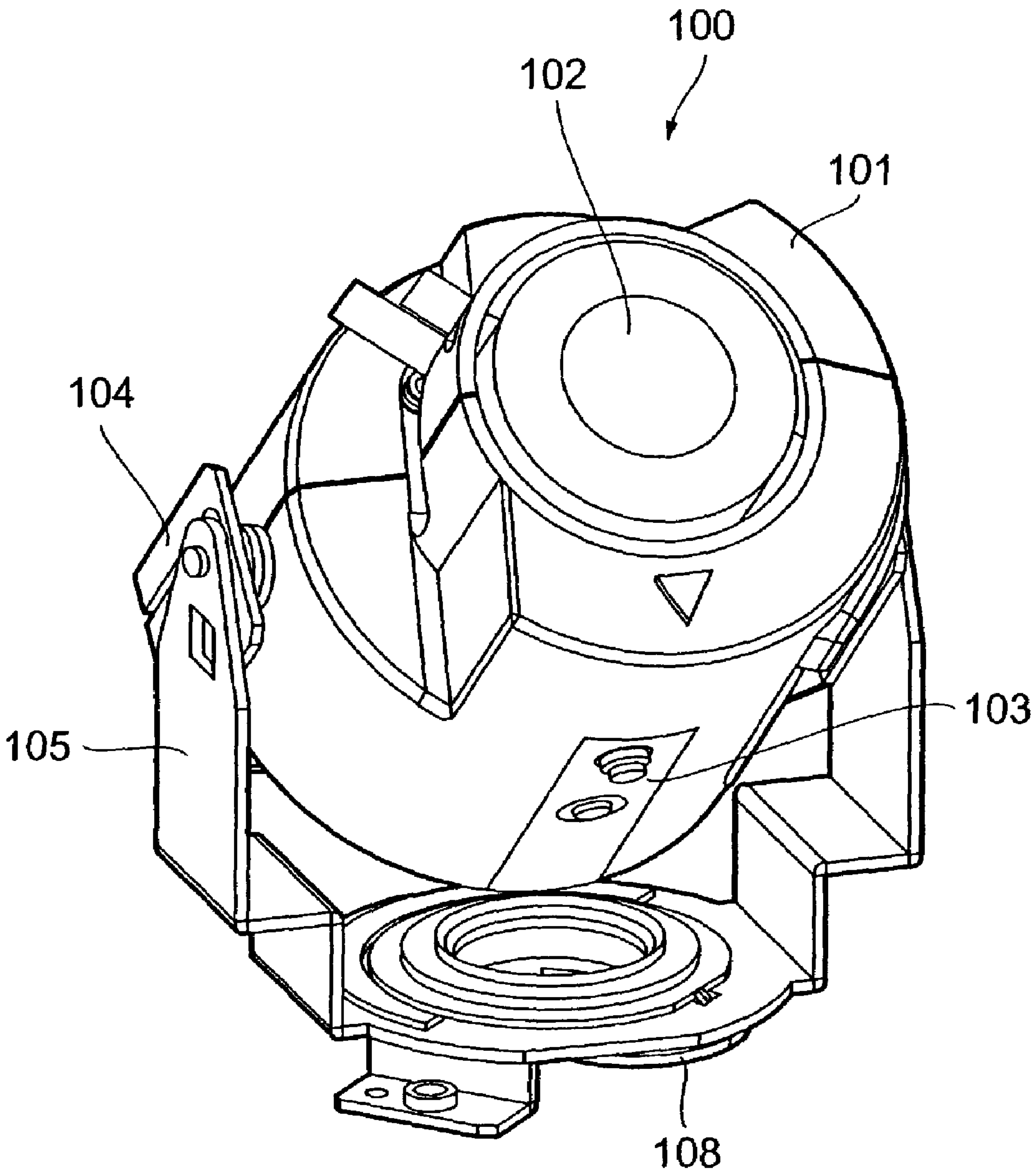
FIG. 5 PRIOR ART
FIG. 5 is a perspective view which shows a conventional surveillance camera device.
Figure 6:
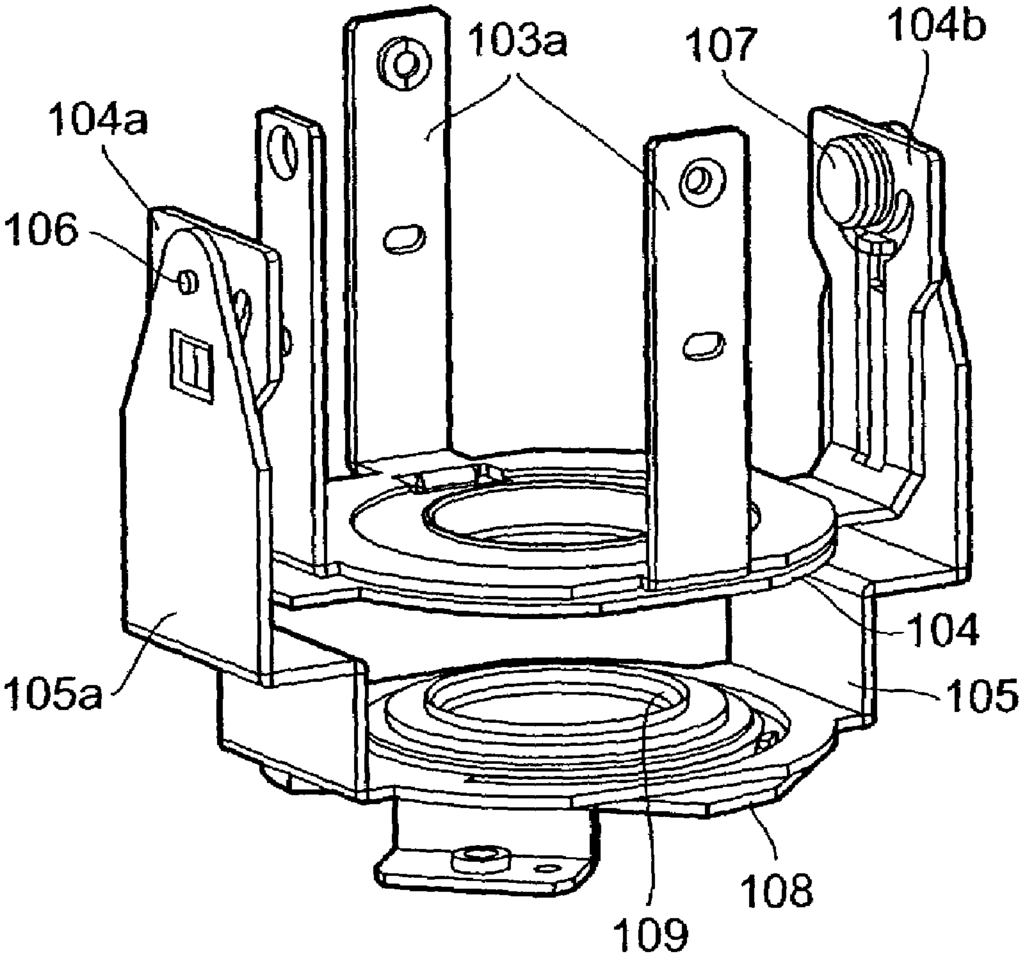
FIG. 6 PRIOR ART
FIG. 6 is a perspective view which shows an internal structure of the camera device of FIG. 5.

The rotary bracket 38 is, as clearly shown in FIG. 4, made of an annular plate. The upright arm 39 is formed integrally with the annular plate and extends vertically. The upright arm 40 is secured on the periphery of the annular plate through screws. The upright arms 39 and 40 have holes 41 and 42 elongated in a lengthwise direction thereof. An axis screw 43 consisting of an axis portion and a threaded portion is inserted into the elongated hole 41 from outside the upright arm 39 through an upper mount ring 44*a* of a torsion coil spring 44 and engaged in a screw hole 45 formed in the upright strip 33*a* of the rotary base 33. A lower mount ring 44*b* of the torsion coil spring 44 is installed on the support arm 39 of the rotary bracket 38 through a small axis screw 46. Specifically, the upper mount ring 44*a* and the lower mount ring 44*b* are hung on the axes of the screws 43 and 46 at a given interval away from each other, thus allowing the casing 30 to tilt to the rotary bracket 38. The torsion coil spring 44 works to urge the axis screw 43 elastically into constant abutment on an upper end of the elongated hole 41. An axis screw 47 is inserted into the elongated hole 42 from outside the support arm 40 through an upper mount ring 48*a* of a torsion coil spring 48 and engaged in a screw hole 50 formed in the upright strip 33*b* of the rotary base 33 through a hole 49*a* of a tilt plate 49, so that the rotary base 33 or the casing 30 is supported by the rotary bracket 38 to be swingable vertically or tiltable. A lower mount ring 48*b* of the torsion coil spring 48 is installed rotatably on the support arm 40 of the rotary bracket 38 through a small axis screw 51. The torsion coil spring 48 works to urge the axis screw 47 elastically into constant abutment on an upper end of the elongated hole 42. The tilt plate 49 has formed therein a vertical groove 49*b* in which the hole 49*a* is formed and an arc-shaped horizontal guide hole 49c formed in a lower portion of the vertical groove 49*b*. The vertical groove 49*a* has a width substantially identical with that of the support arm 40. The support arm 40 is engaged in the vertical groove 49*b* of the tilt plate 49 to hold the tilt plate 49 from rotating. A guide pin 52 installed on the upright strip 33b of the rotary base 33 is inserted into the guide hole 49*c* to be swingable therewithin, thereby defining a tilt angular range within which the rotary base 33 or the casing 30 is tiltable relative to the rotary bracket 38.

The installation of the surveillance camera device will be described below.

First, the connectors 36 and 37 of the camera unit 4 are joined to connectors installed on the main circuit substrate of the mount body 3. Next, the guide roller 20 (i.e., the tension roller) is pressed outward through the lever 25 and kept as it is. The camera unit 4 is put in the mount body 3. The periphery of the rotary bracket 38 of the camera unit 4 are placed in contact with the guide rollers 18 and 19, after which the lever 25 is released to bring the guide roller 20 into contact with the periphery of the rotary bracket 38, so that the rotary bracket 38 is pressed elastically by the torsion coil spring 28 of the guide roller 20, thereby applying a brake to a horizontal rotation of the camera unit 4. This permits the camera unit 4 to be adjusted in a pan angle and held at a desired horizontal angular position. The camera unit 4 is also rotatable vertically about the axis screws 43 and 47, thereby permitting the camera unit 4 to be adjusted in a tilt angle and held at a desired vertical angular position.

Specifically, in the installation of the surveillance camera device on the ceiling or wall of a building, a surveillance orientation toward, for example, an entrance of the building is fixed by adjusting the pan angle and the tilt angle of the camera unit 4. The pan angle is fixed by using a vis(es) 330 and a washer(s) 340, as shown in FIG. 2(*a*). The tilt angle is fixed by tightening the axis screws 43 and 47. In a case where the surveillance camera unit is installed on a side wall of the building, the adjustment of the pan and tilt angles may cause an image captured by the camera unit 4 to be inclined. This inclination is corrected by turning the adjustment ring 32 of the casing 30 to adjust the yaw angle of the camera unit 4. These adjustments are accomplished by an installation operator while watching the monitor.

The rotary base 33 working to support the camera unit 4 is, as described above, retained by the rotary bracket 38 using the screws 43 and 47 which are inserted into the holes 41 and 42 elongated vertically in the support arms 39 and 40 so as to allow the rotary base 33 to move straight in a vertical direction as well as to swing vertically to tilt the camera unit 4. Thus, if the domed cover assembly 2 is beaten with, for example, a stick or bat, so that the impact is added to the camera unit 4, it will cause the rotary base 33 to move vertically while compressing the torsion coil springs 44 and 48, thereby absorbing the damaging impact on the camera unit 4.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For instance, the surveillance camera device uses the rotary bracket 38 retaining the rotary base 33 carrying the camera unit 4 to be swingable vertically, but may alternatively use any other similar rotary mechanism. The camera unit 4 may alternatively be installed fixedly on the rotary base 33. The rotary base 33 may alternatively be installed fixedly on the rotary bracket 38. The torsion coil springs 44 and 48 used as elastic members working to absorb the impact on the camera unit 4 may be replaced with cushion members such as rubber. The cover 6 may alternatively be of any shape other than a dome.

What is claimed is:

1. A surveillance camera device comprising:

a camera unit working to capture an image of a surveillance target and output an image signal indicative of the captured image;

a supporting member supporting said camera unit;

a bracket supporting said supporting member, said bracket having a support arm in which a hole elongated in a vertical direction which is parallel to an axis of said bracket is formed, said supporting member being retained by said bracket through a screw inserted into the elongated hole so as to permit said supporting member to move straight in the vertical direction along the elongated hole as well as to rotate in the vertical direction about the screw;

an elastic member working to elastically urge said supporting member away from said bracket;

a mount body on which said bracket is mounted; and a cover installed on said mount body.

2. A surveillance camera device as set forth in claim 1, wherein said elastic member is implemented by a coil spring disposed between said screw and the support arm.

3. A surveillance camera device as set forth in claim 1, further comprising a tilt plate disposed between said supporting member and the support arm, said tilt plate working to define a tilt angle of said supporting member relative to said bracket.

4. A surveillance camera device as set forth in claim 1, wherein said bracket is made of an annular plate.

5. A surveillance camera device as set forth in claim 1, wherein said bracket is retained at a periphery thereof by at least one tension roller and a plurality of guide rollers.

* * * * *